United States Patent
Koh (10) Patent No.: US 12,005,756 B2
(45) Date of Patent: Jun. 11, 2024

(54) INDICATOR CONTROL SYSTEM

(71) Applicant: Hyundai Transys Inc., Seosan-si (KR)

(72) Inventor: Sang Kyung Koh, Yongin-si (KR)

(*) Notice: Subject to any disclaimer, the term of this patent is extended or adjusted under 35 U.S.C. 154(b) by 176 days.

(21) Appl. No.: 17/817,105

(22) Filed: Aug. 3, 2022

(65) Prior Publication Data

US 2023/0063477 A1 Mar. 2, 2023

(30) Foreign Application Priority Data

Aug. 27, 2021 (KR) .......... 10-2021-0113906

(51) Int. Cl.
*B60H 1/00* (2006.01)

(52) U.S. Cl.
CPC ..... *B60H 1/00285* (2013.01); *B60H 1/00735* (2013.01)

(58) Field of Classification Search
CPC .......... B60H 1/00285; B60H 1/00735; B60H 1/00985; B60H 1/0065; B60N 2/5678; B60N 2/562; H05B 45/44–46
See application file for complete search history.

(56) References Cited

FOREIGN PATENT DOCUMENTS

| JP | H06103094 B2 * | 12/1994 | ............... F23N 5/26 |
| JP | 2009204712 A | 9/2009 | |
| KR | 1020080026354 A | 3/2008 | |
| KR | 10-2276414 B1 | 7/2021 | |
| KR | 102276414 B1 * | 7/2021 | ............. H05B 45/40 |

OTHER PUBLICATIONS

Written Decision on Registration in Korean Patent Application No. 10-2021-0113906 dated Nov. 13, 2023.
Office Action dated Feb. 20, 2023 in Korean Application No. 10-2021-0113906.

* cited by examiner

*Primary Examiner* — Abdullah A Riyami
*Assistant Examiner* — Syed M Kaiser
(74) *Attorney, Agent, or Firm* — QUANTUM PATENT LAW FIRM; Seongyoune Kang (57) ABSTRACT

An indicator control system includes N switches connected to circuitry configured to control the N switches, N+1 first indicators connected to the N switches to indicate performance intensity of the heater or ventilation, and a switching element connected in series with one of the first indicators and controlled by one of the switches, wherein, when the one of the switches is turned off, the switching element and the one of the first indicator are turned off.

17 Claims, 6 Drawing Sheets

INDICATOR CONTROL SYSTEM

CROSS-REFERENCE TO RELATED APPLICATION

This application claims under 35 U.S.C. § 119(a) the benefit of priority to Korean Patent Application No. 10-2021-0113906 filed on Aug. 27, 2021, the entire contents of which are incorporated herein by reference.

BACKGROUND

(a) Technical Field

The present disclosure relates to an indicator control system capable of simplifying switches for controlling indicators indicating performance intensities of a heater and ventilation.

(b) Background Art

In general, ventilation and/or heater functions are applied to seats provided in vehicles currently shipped for driver convenience. The heater function provides heat to passengers sitting on seats and keeps the seats warm in such a manner that a heating wire configured to generate heat by electricity is installed in a seat cover and connected to a vehicle battery to receive power from the battery and generate heat. The ventilation function provides cold air to a driver through a seat in such a manner that a fan configured to circulate the air is installed in the seat, cooled air is circulated inside the seat in cooperation of the fan and an air conditioner of the vehicle, and a porous structure is applied to a seat cover.

In order to execute the heater and ventilation functions, a user needs to press physical buttons, and a separate physical button for controlling the performance intensity of a heater or ventilation is required. In addition, a light emitting device for indicating multi-level performance intensities of the heaters or ventilation is provided in the button or an air conditioner controller.

When a seat having both heater and ventilation functions is applied to a vehicle, it is necessary to control a plurality of indicators in order to indicate the performance intensities of the heater function and the ventilation function executed in a plurality of stages. For example, three indicators indicating the performance intensity of a heater and three indicators indicating the performance intensity of ventilation are provided. In this case, six switches are required to control ON/OFF of the six indicators. However, as a larger number of switches is applied to an indicator control system, the cost increases and a wiring process becomes complicated.

SUMMARY OF THE DISCLOSURE

An object of the present disclosure is to provide an indicator control system capable of simplifying switches for controlling indicators indicating performance intensities of a heater and ventilation.

An indicator control system according to an embodiment of the present disclosure is provided. The indicator control system includes N switches connected to circuitry configured to control the N switches, N+1 first indicators connected to the N switches to indicate performance intensity of the heater or ventilation, and a switching element connected in series with one of the first indicators and controlled by one of the switches, wherein, when the one of the switches is turned off, the switching element and the one of the first indicator is turned off.

In an example, the one of the first indicator may be connected to the other switch, and when the switching element is turned on, the one of first indicator may operate depending on the operation of the other switch.

In an example, the switches may include a first switch and a second switch, the first indicators may include a (1-1)-th indicator, a (1-2)-th indicator, and a (1-3)-th indicator, the first switch may be connected to the (1-1)-th indicator and the (1-3)-th indicator, the second switch may be connected to the switching element, the (1-2)-th indicators, and the (1-3)-th indicators, the one of the switches may be the second switch, and the one of the first indicator may be the (1-1)-th indicator.

In an example, when both the first switch and the second switch are turned on, the first indicators may be all turned on.

In an example, when one of the first switch and the second switch is turned on, the (1-3)-th indicator may be turned on.

In an example, when the second switch is turned on and the first switch is turned off, the (1-2)-th indicator and the (1-3)-th indicator may be turned on and the (1-1)-th indicator may be turned off.

In an example, the switching element may be disposed between the (1-1)-th indicator and a ground.

An indicator control system according to an embodiment of the present disclosure includes N switches connected to circuitry configured to control the N switches, N+1 first indicators connected to the N switches to indicate performance intensity of the heater or ventilation, N+1 second indicators connected to the N switches to indicate performance intensity of the heater or ventilation, a mode determination switch connected to the controller to control only one of the first indicators and the second indicators to be turned on, a first mode determination switching element for blocking signals applied to the first indicators based on a signal applied from the mode determination switch, and a second mode determination switching element for blocking signals applied to the second indicators based on a signal applied from the mode determination switch, wherein the first mode determination switching element and the second mode determination switching element operate in opposite manners.

In an example, all of the first indicators may be turned off when the first mode determination switching element is turned off, and all of the second indicators may be turned off when the second mode determination switching element is turned off.

In an example, the indicator control system may further include a first switching element connected in series with one of the first indicators and controlled by one of the switches, and a second switching element connected in series with one of the second indicators and controlled by the one of the switches.

In an example, when the one of the switches is turned off, the one of the first indicator and the one of the second indicator may be turned off.

In an example, the switches may include a first switch and a second switch, the first indicators may include a (1-1)-th indicator, a (1-2)-th indicator, and a (1-3)-th indicator, the second indicators may include a (2-1)-th indicator, a (2-2)-th indicator, and a (2-3)-th indicator, the first switch may be connected to the (1-1)-th indicator, the (2-1)-th indicator, the (1-3)-th indicator, and the (2-3)-th indicator, and the second switch may be connected to the first switching element, the second switching element, the (1-2)-th indicator, the (2-2)-th indicator, the (1-3)-th indicator, and the (2-3)-th indicator.

In an example, the one of the switches may be the second switch, the one of the first indicator may be the (1-1)-th indicator, and the one of the second indicator may be the (2-1)-th indicator.

In an example, ON/OFF of the three first indicators or second indicators may be controlled through ON/OFF of the first switch, the second switch, and the mode determination switch.

In an example, the first mode determination switching element may be controlled by the mode determination switch, and the first indicators may be connected to an input terminal of the first mode determination switching element, the input terminal of the first mode determination switching element being connected to the switches, the second mode determination switching element may be controlled by the mode determination switch, and the second indicators may be connected to an input terminal of the second mode determination switching element, and the input terminal of the second mode determination switching element may be connected to the switches.

In an example, the switches may include a first switch and a second switch, the first mode determination switching element may include a (1-1)-th mode determination switching element connected to the second switch and a (1-2)-th mode determination switching element connected to the first switch, and the second mode determination switching element may include a (2-1)-th mode determination switching element connected to the second switch and a (2-2)-th mode determination switching element connected to the first switch.

In an example, the indicator control system may further include a first switching element connected in series with one of the first indicators and controlled by the second switch, and a second switching element connected in series with one of the second indicators and controlled by the second switch, wherein an input terminal of the (1-1)-th mode determination switching element is connected to the first switching element, and an input terminal of the (2-1)-th mode determination switching element is connected to the second switching element.

According to an embodiment of the present disclosure, the controller can control ON/OFF of N+1 indicators by controlling N switches. Accordingly, the number of switches required to control the N+1 indicators can be reduced to N, and thus the effect of reducing wires for connecting the switches and the indicators can be realized.

DETAILED DESCRIPTION

The advantages and features of the present disclosure and the method of attaining the same will become apparent with reference to embodiments described below in detail in conjunction with the accompanying drawings. The present disclosure, however, is not limited to the embodiments disclosed hereinafter and may be embodied in many different forms. Rather, these exemplary embodiments are provided so that this disclosure will be through and complete and will fully convey the scope to those skilled in the art. Thus, the scope of the present disclosure should be defined by the claims. The same reference numbers will be used throughout the specification to refer to the same or like parts.

Further, the reason that the names of components are divided into the first, the second, etc. in the present specification is to distinguish the names of the components when the names are the same, and the names are not necessarily limited to this order in the following description.

The detailed description is illustrative of the embodiments of the present disclosure. In addition, the above description shows and describes preferred embodiments of the present disclosure, and the present disclosure can be used in various other combinations, modifications, and environments. That is, the present disclosure can be changed or modified within the scope of the concept of the disclosure disclosed herein, the scope equivalent to the described disclosure, and/or the scope of skill or knowledge in the art. The embodiment describes the best state for implementing the technical idea of the present disclosure, and various changes required in specific application fields and uses of the present disclosure are possible. Therefore, the detailed description of the present disclosure is not intended to limit the present disclosure to the disclosed embodiments. Further, the appended claims should be construed as including other embodiments.

Figure 1:
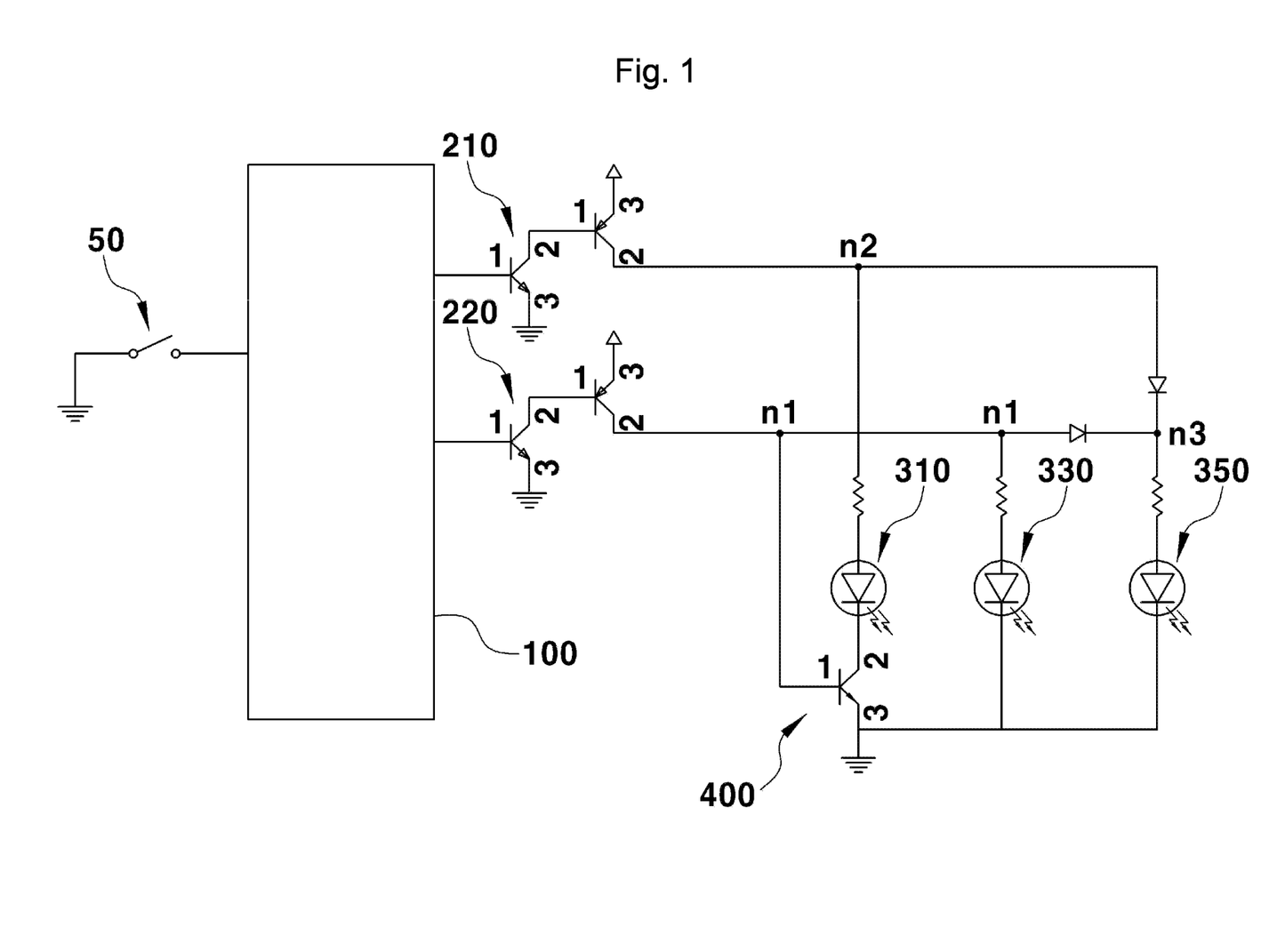
FIG. 1 is a view illustrating an indicator control system according to an embodiment of the present disclosure.

FIG. 1 is a view illustrating an indicator control system according to an embodiment of the present disclosure.

Referring to FIG. 1, the indicator control system may be a system for controlling indicators 310, 330, and 350 indicating performance intensities of a heater and ventilation mounted in a vehicle seat. The indicator control system may include a button 50, a controller 100, switches 210 and 220, the indicators 310, 330, and 350, and a switching element 400.

The button 50 may be a physical component for controlling the performance intensity of the heater or ventilator mounted in the vehicle seat. As an example, the performance intensity of the heater or ventilation may be adjusted to three levels, and when the button 50 is pressed once, the performance intensity of the heater or ventilation may be set to the third level. When the button 50 is pressed twice, the performance intensity of the heater or ventilation may be set to the second level, and when the button 50 is pressed three times, the performance intensity of the heater or ventilation may be set to the first level. In an embodiment of the present disclosure, the button 50 may be a button for controlling the performance intensity of the heater.

The controller 100 may be a component that outputs signals for controlling the heater and ventilation of the vehicle seat. The controller 100 may receive a signal generated as a user operates the button 50 and control the switches 210 and 220 according to the signal. That is, the controller 100 may control the switches 210 and 220 based on the number of times the user presses the button 50. The controller 100 is a kind of processor or an electronic control unit (ECU) applied to the vehicle seat. For example, the controller 100 may be circuitry for controlling the switches 210 and 220. For example, the controller 100 may be implemented in software, firmware, hardware, or some suitable combination.

The switches 210 and 220 may control light emission of the first indicators 310, 330, and 350. Each of the switches 210 and 220 may include a plurality of transistors. N switches 210 and 220 may be provided, and N+1 first indicators 310, 330, and 350 may be provided. For example, ON/OFF of the first indicators 310, 330, and 350 may be controlled by controlling the two switches 210 and 220. The two switches 210 and 220 may be connected to the controller 100. The switches 210 and 220 may be controlled by the controller 100 to apply a 12 V voltage signal input from a battery (not shown) to the first indicators 310, 330, and 350. The switches 210 and 220 may include a first switch 210 and a second switch 220. For example, the second switch 220 may be connected to a first node n1 and the first switch 210 may be connected to a second node n2.

The first indicators 310, 330, and 350 may be connected to the switches 210 and 220 to indicate the performance intensity of the heater or ventilation. For example, the first indicators 310, 330, and 350 may be LEDs. The first indicators 310, 330, and 350 may be turned ON/OFF based on voltage signals applied from the switches 210 and 220. The first indicators 310, 330, and 350 may include a (1-1)-th indicator 310, a (1-2)-th indicator 330, and a (1-3)-th indicator 350.

The switching element 400 may be connected in series with one 310 of the first indicators 310, 330, and 350 and controlled by one 220 of the switches 210 and 220. For example, the switching device 400 may be a transistor. For example, one indicator may be the (1-1)-th indicator 310 and one of the switches 220 may be the second switch 220. The switching element 400 may be disposed between the (1-1)-th indicator 310 and the ground. When the switching element 400 is turned on, the (1-1)-th indicator 310 may operate depending on the operation of the first switch 210. The switching element 400 may be connected to the second switch 220 through the first node n1 and may be controlled by the second switch 220. In other words, a control terminal of the switching element 400 may be connected to the second switch 220. An input terminal of the switching element 400 may be connected to the (1-1)-th indicator 310, and an output terminal of the switching element 400 may be connected to the ground. For example, when the second switch 220 is turned off, the switching element 400 may be turned off, and as the switching element 400 is turned off, the (1-1)-th indicator 310 may always be maintained in an off state.

One end of the (1-1)-th indicator 310 may be connected to the first switch 210 through the second node n2. The other end of the (1-)-th indicator 310 may be connected to the switching element 400. One end of the (1-2)-th indicator 330 may be connected to the second switch 220 through the first node n1. The other end of the (1-2)-th indicator 330 may be connected to the ground. Voltage signals from the first switch 210 and the second switch 220 may be applied to one end of the (1-3)-th indicator 350 through a third node n3. A diode for rectification may be disposed between the second node n2 and the third node n3. A diode for rectification may be disposed between the first node n1 and the third node n3. That is, voltage signals may be applied to the third node n3 that is one end of the (1-3)-th indicator 350 from both the first switch 210 and the second switch 220. The other end of the (1-3)-th indicator 350 may be connected to the ground.

According to an embodiment of the present disclosure, the controller 100 may control ON/OFF of the three first indicators 310, 330, and 350 by controlling the two switches 210 and 220. Accordingly, the number of switches required to control the three first indicators 310, 330, and 350 can be reduced to two, and thus the number of wires for connecting the switches and the first indicators 310, 330, and 350 can be reduced.

Figure 2:
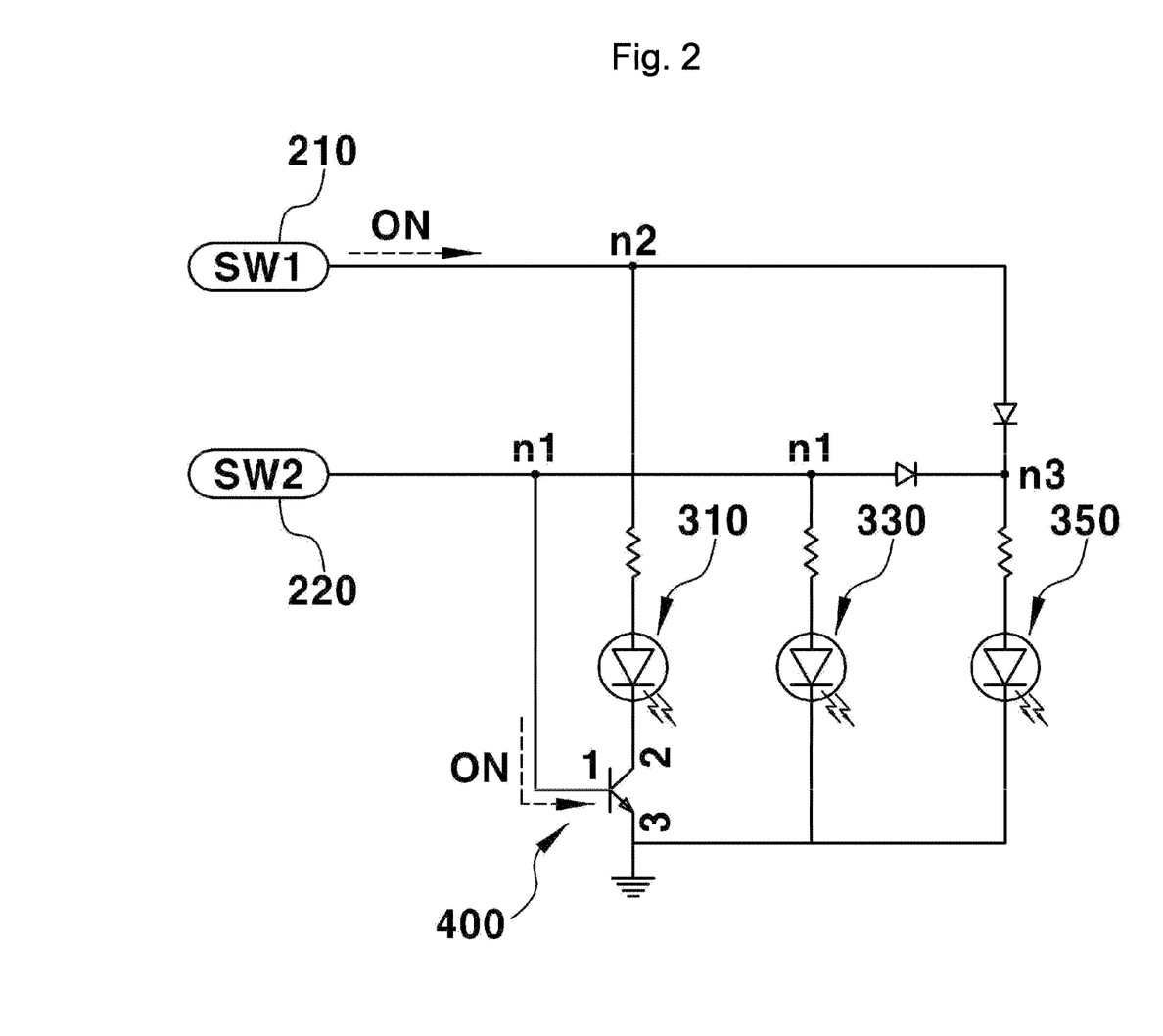
FIGS. 2 to 4 are views illustrating an operation example of the indicator control system according to an embodiment of the present disclosure.
Figure 3:
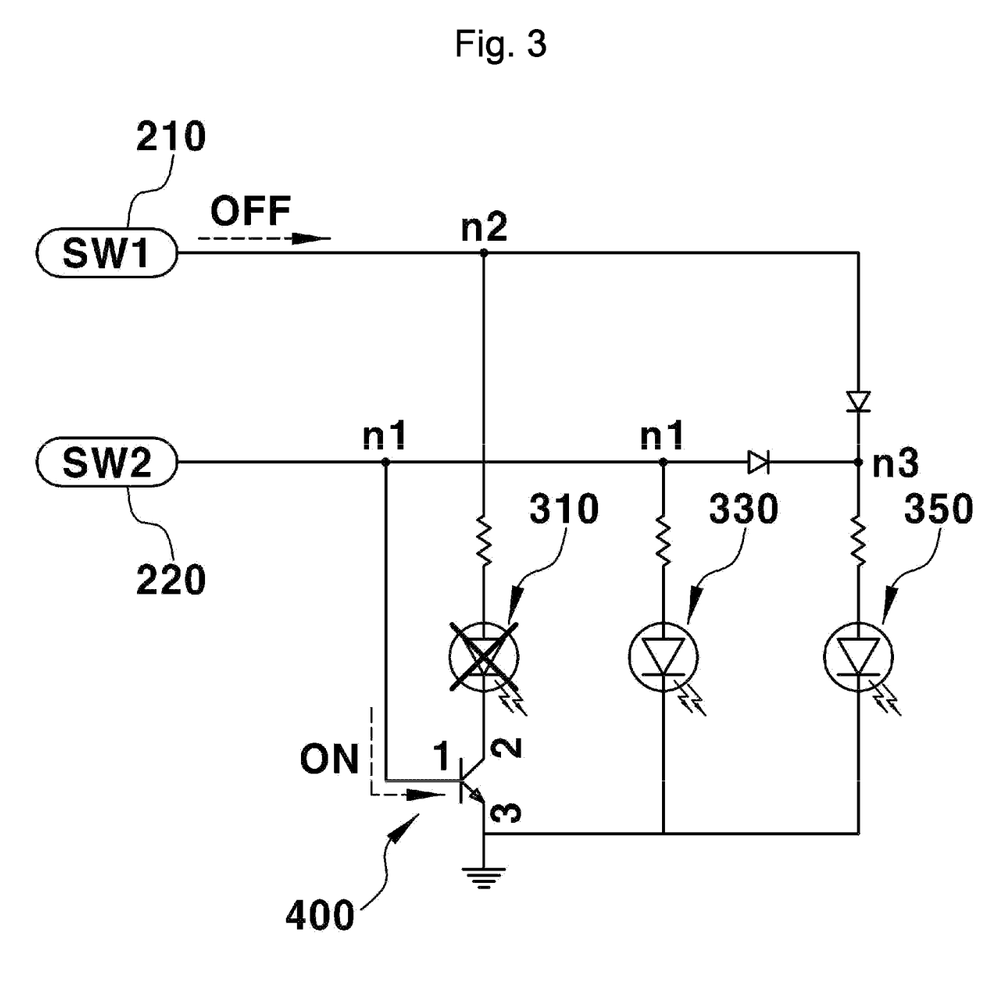
Figure 4:
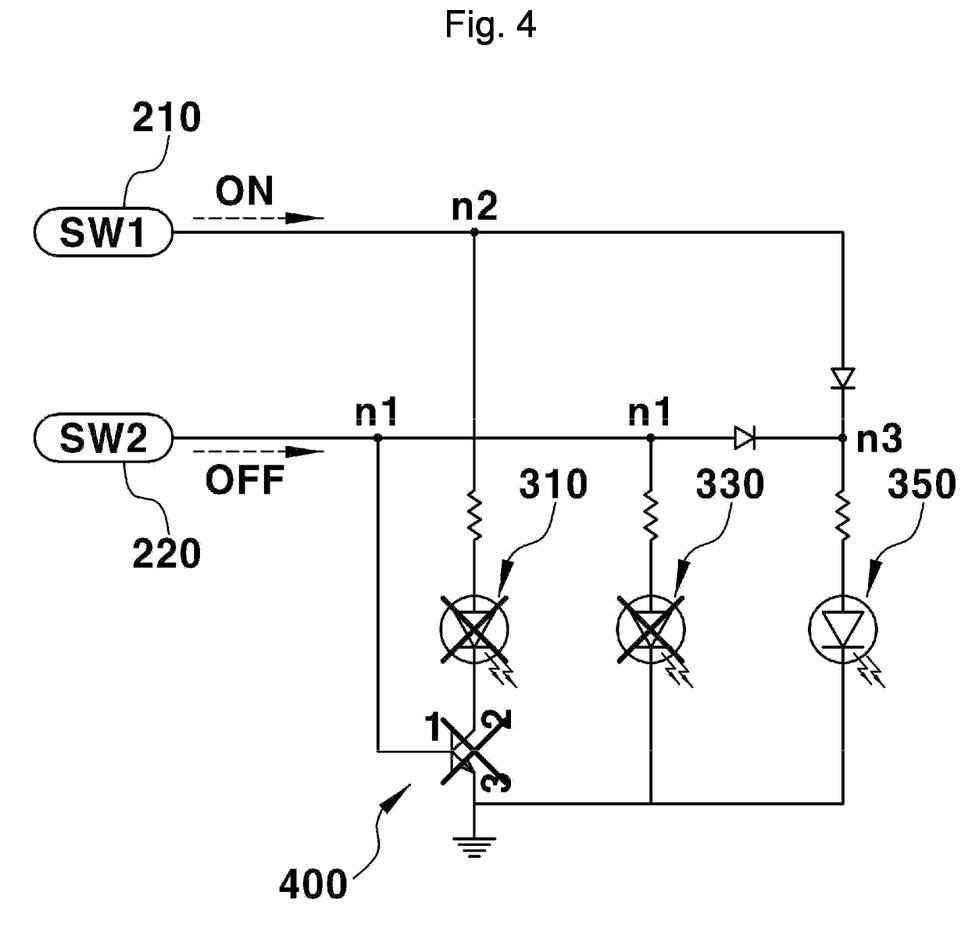

FIGS. 2 to 4 are views illustrating an operation example of the indicator control system according to an embodiment of the present disclosure.

Referring to FIG. 2, when the first switch 210 and the second switch 220 are turned on, all the three first indicators 310, 330, and 350 may be turned on. As the second switch 220 is turned on, the switching element 400 can be turned on. As the switching element 400 is turned on, a voltage signal output from the first switch 210 can be applied to the (1-1)-th indicator 310. In other words, when the switching element 400 is turned on, the (1-1)-th indicator 310 may operate depending on the operation of the first switch 210. In addition, a voltage signal output from the second switch 220 can be applied to the (1-2)-th indicator 330, and the voltage signals output from the first switch 210 and the second switch 220 can be applied to the (1-3)-th indicator 350. Accordingly, all the first indicators 310, 330, and 350 can be turned on.

Referring to FIG. 3, when the first switch 210 is turned off and the second switch 220 is turned on, the (1-2)-th indicator 310 and the (1-3)-th indicator 350 can be turned on and the (1-1)-th indicator 310 can be turned off. As the second switch 220 is turned on, the voltage signal output from the first switch 210 may be applied to the (1-1)-th indicator 310. However, since the first switch 210 is turned off, the voltage signal may not be applied to the (1-1)-th indicator 310. Accordingly, the (1-1)-th indicator 310 may be turned off. As the second switch 220 is turned on, the (1-2)-th indicator 330 and the (1-2)-th indicator 350 can be turned on.

Referring to FIG. 4, when the second switch 220 is turned off and the first switch 210 is turned on, the (1-1)-th indicator 310 and the (1-2)-th indicator 330 can be turned off and the (1-3)-th indicator 350 may be turned on. As the second switch 220 is turned off, the switching element 400 can be turned off, and as the switching element 400 is turned off, the voltage signal output from the first switch 210 may not be applied to the (1-1)-th indicator 310. Further, since the (1-2)-th indicator 330 receives the voltage signal from the second switch 220, the (1-2)-th indicator 330 can be turned off. As the first switch 210 is turned on, the (1-3)-th indicator 330 can be turned on.

Figure 5:
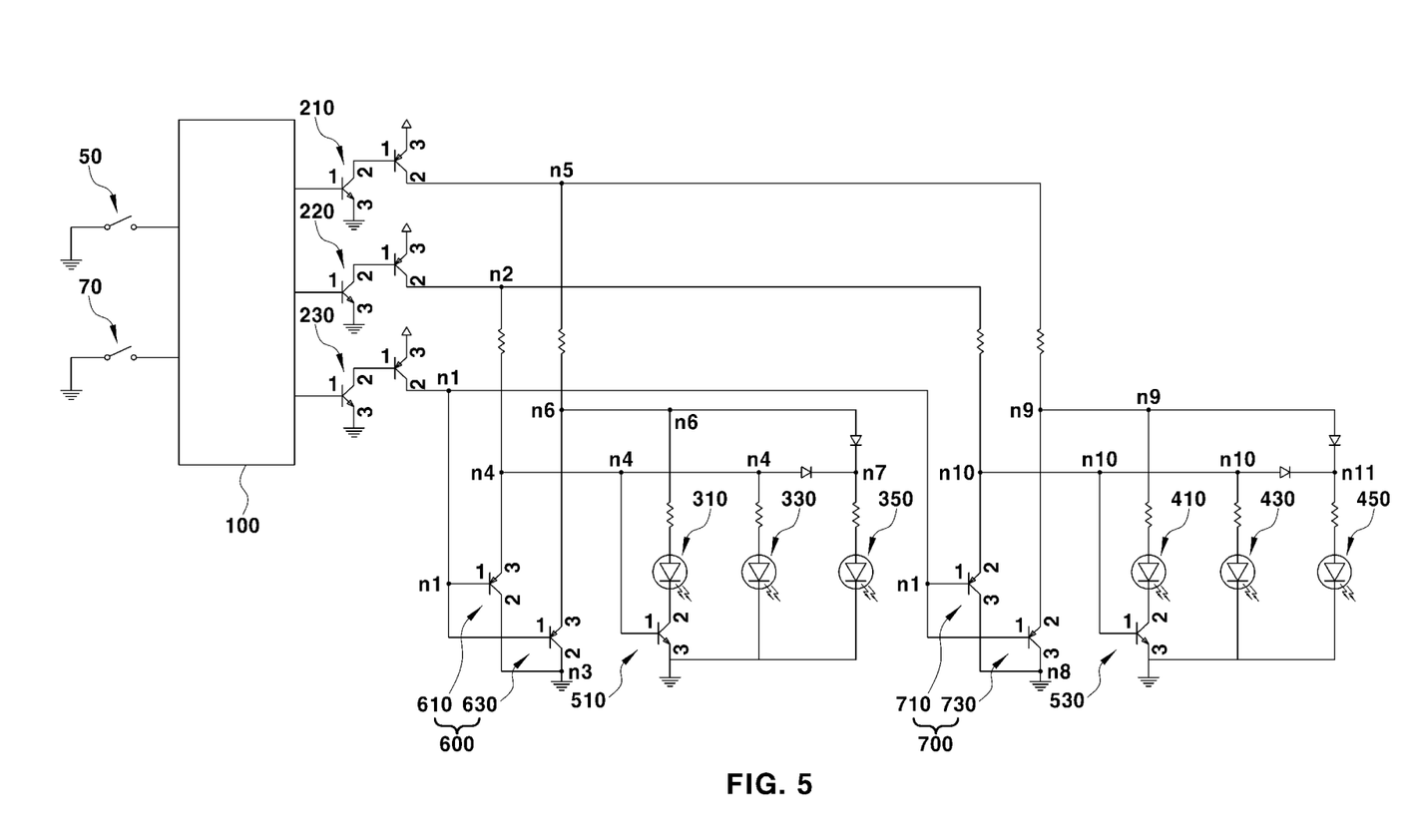
FIG. 5 is a view illustrating an indicator control system capable of simultaneously controlling ventilation and a heater according to an embodiment of the present disclosure.

FIG. 5 is a view illustrating an indicator control system capable of simultaneously controlling ventilation and a heater according to an embodiment of the present disclosure. For brevity of description, redundant description in FIG. 1 and FIG. 5 will be omitted.

Referring to FIG. 5, the indicator control system may simultaneously control ventilation and a heater mounted in a vehicle seat. The indicator control system includes buttons 50 and 70, a controller 100, switches 210 and 220, a mode determination switch 230, indicators 310, 330, 350, 410, 430, 450, switching elements 510 and 530, and mode determination switching elements 600 and 700.

As the buttons 50 and 70, a heater button 50 and a ventilation button 70 may be provided. The heater button 50 and the ventilation button 70 may apply control signals to the controller 100. The controller 100 may control the three switches 210, 220, and 230.

The switches 210 and 220 and the mode determination switch 230 may be connected to the controller 100 to control light emission of the first indicators 310, 330, and 350 and the second indicators 410, 430, and 450. N switches 210 and 220 may be provided, and N+1 first indicators 310, 330, and 350 and N+1 second indicators 410, 430, and 450 may be provided. For example, ON/OFF of the six indicators 310, 330, 350, 410, 430, and 450 may be controlled by the two switches 210 and 220 and the mode determination switch 230.

The switches 210 and 220 may include a first switch 210 and a second switch 220. The first switch 210 and the second switch 220 may be controlled by the controller 100 to apply a 12 V voltage signal input from a battery (not shown) to the first indicators 310, 330, and 350 or the second indicators 410, 430, and 450.

The mode determination switch 230 may be connected to the mode determination switching elements 600 and 700. For example, each of the mode determination switching elements 600 and 700 may include a plurality of transistors. As the mode determination switch 230 is controlled, it is possible to determine whether the switches 210 and 220 control the first indicators 310, 330, and 350 indicating the performance intensity of the heater or the second indicators 410, 430, and 450 indicating the performance intensity of ventilation. ON/OFF of the mode determination switch 230 may be determined based on which button 50 or 70 is pressed by a user. The mode determination switching elements 600 and 700 may include a first mode determination switching element 600 and a second mode determination switching element 700. The first mode determination switching element 600 may block signals applied to the first indicators 310, 330, and 350 based on a first signal applied from the mode determination switch 230. The second mode determination switching element 700 may block signals applied to the second indicators 410, 430, and 450 based on a second signal applied from the mode determination switch 230. The first mode determination switching element 600 and the second mode determination switching element 700 may operate in opposite manners. That is, when the first mode determination switching element 600 is turned on, the second mode determination switching element 700 may be turned off. For example, when the first mode determination switching element 600 is turned off, all the first indicators 310, 330, and 350 may be turned off. For example, when the second mode determination switching element 700 is turned off, all the second indicators 410, 430, and 450 may be turned off.

The switching elements 510 and 530 may include a first switching element 510 and a second switching element 530. The first switching element 510 may be connected in series with one 310 of the first indicators 310, 330, and 350. The second switching element 530 may be connected in series with one 410 of the second indicators 410, 430, and 450. The first switching element 510 may be controlled by one of the switches and the second switching element 530 may be controlled by one of the switches. For example, one of the switches may be the second switch 220.

The first indicators 310, 330, and 350 may include a (1-1)-th indicator 310, a (1-2)-th indicator 330, and a (1-3)-th indicator 350. The second indicators 410, 430, and 450 may include a (2-1)-th indicator 410, a (2-2)-th indicator 430, and a (2-3)-th indicator 450. The first switch 210 may be connected to the (1-1)-th indicator 310, the (2-1)-th indicator 410, the (1-3)-th indicator 350, and the (2-3)-th indicator 450. The second switch 220 may be connected to the first switching element 510, the second switching element 530, the (1-2)-th indicator 330, the (2-2)-th indicator 430, the (1-3)-th indicator 350, and the (2-3)-th indicator 450.

The mode determination switch 230 may be connected to control terminals of the first mode determination switching element 600 and the second mode determination switching element 700. An input terminal of the first mode determination switching element 600 may be connected to input terminals of the first indicators 310, 330, and 350, and an input terminal of the second mode determination switching element 700 may be connected to the second indicators 410, 430, and 450. The control terminal of each of the first mode determination switching element 600 and the second mode determination switching element 700 may be a first node n1. The first mode determination switching element 600 may include a (1-1)-th mode determination switching element 610 connected to the second switch 220 and a (1-2)-th mode determination switching element 630 connected to the first switch 210. The second mode determination switching element 700 may include a (2-1)-th mode determination switching element 710 connected to the second switch 220 and a (2-2)-th second mode determination switching element 730 connected to the first switch 210. An input terminal of the (1-1)-th mode determination switching element 610 may be a fourth node n4, and the fourth node n4 may be connected to a second node n2 that is an output terminal of the second switch 220. The fourth node n4 may be connected to a control terminal of the first switching element 510. An input terminal of the (1-2)-th mode determination switching element 630 may be a sixth node n6, and the sixth node n6 may be connected to a fifth node n5 that is an output terminal of the first switch 210. An input terminal of the (2-1)-th mode determination switching element 710 may be a tenth node n10, and the tenth node n10 may be connected to the second node n2 that is the output terminal of the second switch 220. The tenth node n10 may be connected to a control terminal of the second switching element 530. An input terminal of the (2-2)-th mode determination switching element 730 may be a ninth node n9, and the ninth node n9 may be connected to the fifth node n5 that is the output terminal of the first switch 210. A third node n3 that is an output terminal of each of the (1-1)-th mode determination switching element 610 and the (1-2)-th mode determination switching element 630 may be connected to the ground, and an eighth node n8 that is an output terminal of each of the (2-1)-th mode determination switching element 710 and the (2-2)-th mode determination switching element 730 may be connected to the ground.

The fourth node n4 connected to the second switch 220 may be connected to a seventh node n7 that is input terminals of the (1-2)-th indicator 330 and the (1-3)-th indicator 350. A rectification diode may be disposed between the fourth node n4 and the seventh node n7. The seventh node n7 may be connected to the sixth node n6. A rectification diode may be disposed between the seventh node n7 and the sixth node n6. Accordingly, voltage signals from the first switch 210 and the second switch 220 may be applied to the (1-3)-th indicator 350. The first switching element 510 may be connected in series with the (1-1)-th indicator 310, and the output terminal of the first switching element 510 may be connected to the ground. The (1-1)-th indicator 310 may be connected to the sixth node n6 to receive a voltage signal from the first switch 210.

The tenth node n10 connected to the second switch 220 may be connected to an eleventh node n11 that is input terminals of the (2-2)-th indicator 430 and the (2-3)-th indicator 450. A rectification diode may be disposed between the tenth node n10 and the eleventh node n11. The eleventh node n11 may be connected to the ninth node n9. A rectification diode may be disposed between the eleventh node n11 and the ninth node n9. Accordingly, voltage signals from the first switch 210 and the second switch 220 may be applied to the (2-3)-th indicator 450. The second switching element 530 may be connected in series with the (2-1)-th indicator 410, and the output terminal of the second switching element 530 may be connected to the ground. The (2-1)-th indicator 410 may be connected to the ninth node n9 to receive a voltage signal from the first switch 210.

For example, the first mode determination switching element 600 and the second mode determination switching element 700 may be controlled by the mode determination switch 230. When a 12 V voltage signal is output from the mode determination switch 230, the first mode determination switching element 600 can be turned off and the second mode determination switching element 700 can be turned on. When the voltage signal is not output from the mode determination switch 230, the first mode determination switching element 600 can be turned on and the second mode determination switching element 700 can be turned off. That is, the mode determination switch 230 determines whether the switches 210 and 220 control the first indicators 310, 330, and 350 or the second indicators 410, 430, and 450.

For example, when the second switch 220 is turned off, the indicators 310 and 410 connected in series with the switching elements 510 and 530 can be turned off.

The indicator control system according to an embodiment of the present disclosure may have a circuit structure in which a circuit structure for indicating the performance intensity of ventilation and a circuit structure for indicating the performance intensity of the heater are combined. The mode determination switching elements 600 and 700 may be applied to the indicator control system such that the two circuit structures are controlled by three switches. In addition, it can be determined whether the performance intensity of ventilation is externally indicated or the performance intensity of the heater is externally indicated through the mode determination switch 230 that controls the mode determination switching elements 600 and 700. That is, upon determining that one of ventilation and heater modes will be indicated, ON/OFF of the first indicators 310, 330, and 350 or the second indicators 410, 430, and 450 may be controlled by the first switch 210 and the second switch 220.

According to an embodiment of the present disclosure, ON/OFF of the three first indicators 310, 330, and 350 or second indicators 410, 430, and 450 may be controlled by turning on/off the first switch 210, the second switch 220, and the mode determination switch 230. Accordingly, the number of switches required to control the six indicators 310, 330, 350, 410, 430, and 450 can be reduced to three, and thus the number of wires for connecting the switches and indicators 310, 330, 350, 410, 430, and 450 can be reduced.

Figure 6:
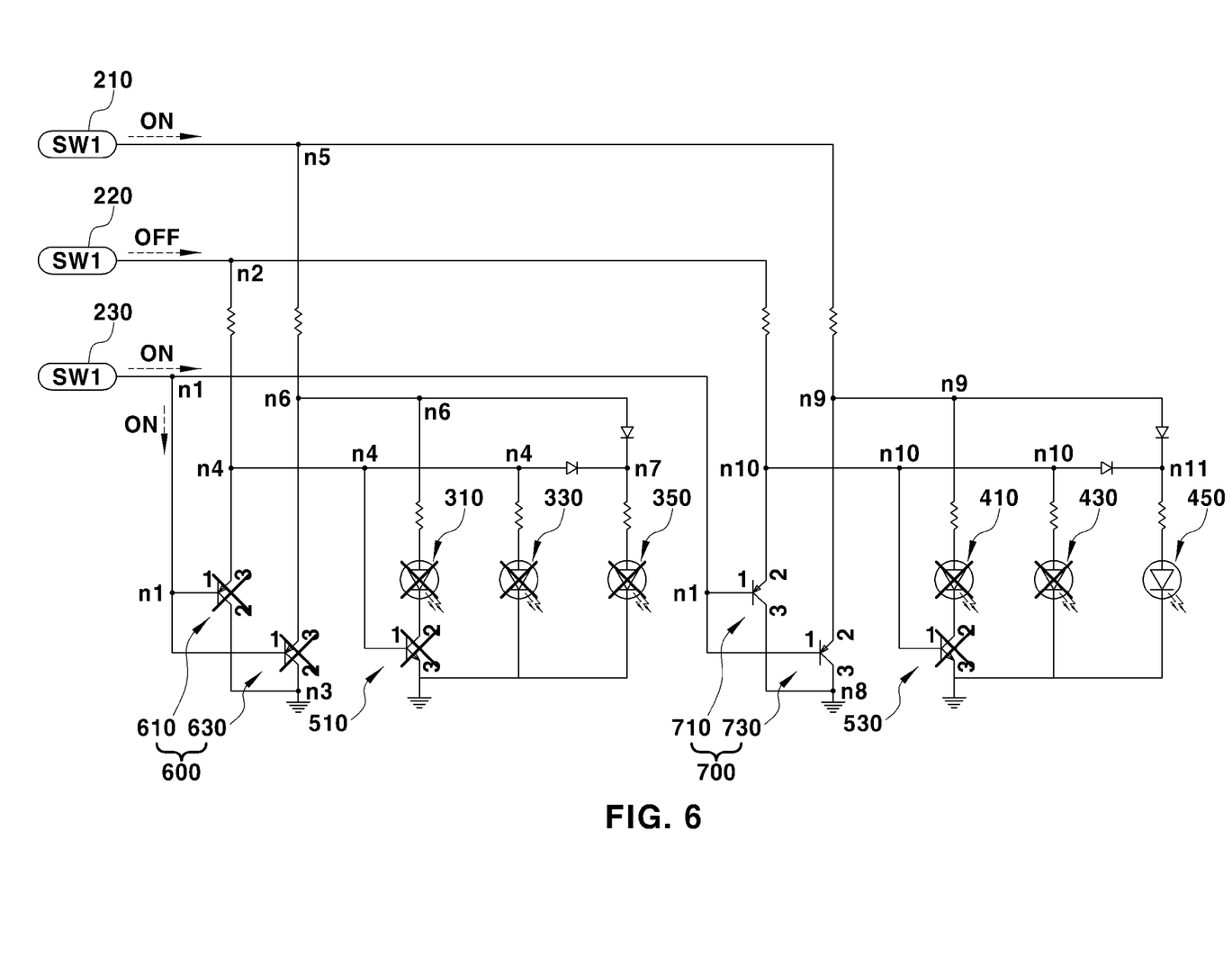
FIG. 6 is a view illustrating an operation example of the indicator control system capable of simultaneously controlling ventilation and a heater according to an embodiment of the present disclosure.

FIG. 6 is a view illustrating an operation example of the indicator control system capable of simultaneously controlling ventilation and a heater according to an embodiment of the present disclosure.

Referring to FIGS. 5 and 6, a user may press the ventilation button 70 three times to operate ventilation of a seat at the first level, and thus the mode determination switch 230 and the first switch 210 can be turned on and the second switch 220 can be turned off. As the mode determination switch 230 is turned on, the first mode determination switching element 600 can be turned off and the first indicators 310, 330, and 350 can be turned off. As the mode determination switch 230 is turned on, the second mode determination switching element 700 can be turned on, and as the second switch 220 is turned off, the (2-1)-th indicator 410 and the (2-2)-th indicator 430 can be turned off. The input terminal of the (2-3)-th indicator 450 can receive a voltage signal from the first switch 210 in addition to the second switch 220, and since the first switch 210 is turned on, the (2-3)-th indicator 450 can be on. As a result, only the (2-3)-th indicator 450 can be turned on by the user pressing the ventilation button 70 three times.

Upon determining whether to indicate the performance intensity of ventilation or the performance intensity of the heater, the operating state of the circuit according to ON/OFF of the first switch 210 and the second switch 220 can be the same as those shown in FIGS. 2 to 4. Since the mode determination switch 230 does not control ON/OFF of the indicators 310, 330, 350, 410, 430, and 450, the three indicators (the first indicators 310, 330, and 350 or the second indicators 410, 430, and 450) can be controlled by the two switches 210 and 220.

Embodiments of the present disclosure have been described with reference to the accompanying drawings. However, it will be appreciated by those skilled in the art to which the present disclosure pertains that the present disclosure can be implemented in other specific forms without changing its technical spirit or essential features. Therefore, it should be understood that the embodiments described above are illustrative in all respects and not restrictive.

What is claimed is:

1. An indicator control system comprising:
   N switches connected to circuitry configured to control the N switches;
   N+1 first indicators connected to the N switches to indicate performance intensity of the heating or ventilation;
   a switching element connected in series with one of the N+1 first indicators and controlled by one of the N switches,
   wherein, when the one of the N switches is turned off, the switching element and the one of the N+1 first indicators are turned off.

2. The indicator control system of claim 1, wherein the one of the N+1 first indicators is connected to another one of the N switches, and when the switching element is turned on, the one of the N+1 first indicators operates depending on the operation of the another one of the N switches.

3. The indicator control system of claim 1, wherein the N switches include a first switch and a second switch,
   the N+1 first indicators include a (1-1)-th indicator, a (1-2)-th indicator, and a (1-3)-th indicator,
   the first switch is connected to the (1-1)-th indicator and the (1-3)-th indicator,
   the second switch is connected to the switching element, the (1-2)-th indicator, and the (1-3)-th indicator,
   the one of the N switches is the second switch, and
   the one of the N+1 first indicators is the (1-1)-th indicator.

4. The indicator control system of claim 3, wherein, when both the first switch and the second switch are turned on, the N+1 first indicators are all turned on.

5. The indicator control system of claim 3, wherein, when one of the first switch and the second switch is turned on, the (1-3)-th indicator is turned on.

6. The indicator control system of claim 3, wherein, when the second switch is turned on and the first switch is turned off, the (1-2)-th indicator and the (1-3)-th indicator are turned on and the (1-1)-th indicator is turned off.

7. The indicator control system of claim 3, wherein the switching element is disposed between the (1-1)-th indicator and ground.

8. An indicator control system comprising:
   N switches connected to circuitry configured to control the N switches;

N+1 first indicators connected to the N switches to indicate performance intensity of heating or ventilation;

N+1 second indicators connected to the N switches to indicate performance intensity of the heating or ventilation;

a mode determination switch connected to the circuitry to control only one of the first indicators and the second indicators to be turned on;

a first mode determination switching element for blocking signals applied to the N+1 first indicators based on a first signal applied from the mode determination switch; and a second mode determination switching element for blocking signals applied to the N+1 second indicators based on a second signal applied from the mode determination switch, wherein the first mode determination switching element and the second mode determination switching element operate in opposite manners.

9. The indicator control system of claim 8, wherein all of the N+1 first indicators are turned off when the first mode determination switching element is turned off, and all of the N+1 second indicators are turned off when the second mode determination switching element is turned off.

10. The indicator control system of claim 8, further comprising:

a first switching element connected in series with one of the N+1 first indicators and controlled by one of the N switches; and a second switching element connected in series with one of the N+1 second indicators and controlled by the one of the N switches.

11. The indicator control system of claim 10, wherein, when the one of the N switches is turned off, the one of the N+1 first indicators and the one of the N+1 second indicators are turned off.

12. The indicator control system of claim 10, wherein the N switches include a first switch and a second switch, the N+1 first indicators include a (1-1)-th indicator, a (1-2)-th indicator, and a (1-3)-th indicator, the N+1 second indicators include a (2-1)-th indicator, a (2-2)-th indicator, and a (2-3)-th indicator, the first switch is connected to the (1-1)-th indicator, the (2-1)-th indicator, the (1-3)-th indicator, and the (2-3)-th indicator, and the second switch is connected to the first switching element, the second switching element, the (1-2)-th indicator, the (2-2)-th indicator, the (1-3)-th indicator, and the (2-3)-th indicator.

13. The indicator control system of claim 12, wherein the one of the N switches is the second switch, the one of the N+1 first indicators is the (1-1)-th indicator, and the one of the N+1 second indicators is the (2-1)-th indicator.

14. The indicator control system of claim 12, wherein ON/OFF of the (1-1)-th indicator, the (1-2)-th indicator, and the (1-3)-th indicator or the (2-1)-th indicator, the (2-2)-th indicator, and the (2-3)-th indicator is controlled through ON/OFF of the first switch, the second switch, and the mode determination switch.

15. The indicator control system of claim 8, wherein the first mode determination switching element is controlled by the mode determination switch, and the N+1 first indicators are connected to an input terminal of the first mode determination switching element, the input terminal of the first mode determination switching element connected to the N switches, the second mode determination switching element is controlled by the mode determination switch, and the N+1 second indicators are connected to an input terminal of the second mode determination switching element, and the input terminal of the second mode determination switching element is connected to the N switches.

16. The indicator control system of claim 15, wherein the N switches include a first switch and a second switch, the first mode determination switching element includes a (1-1)-th mode determination switching element connected to the second switch and a (1-2)-th mode determination switching element connected to the first switch, and the second mode determination switching element includes a (2-1)-th mode determination switching element connected to the second switch and a (2-2)-th mode determination switching element connected to the first switch.

17. The indicator control system of claim 16, further comprising:

a first switching element connected in series with one of the N+1 first indicators and controlled by the second switch; and a second switching element connected in series with one of the N+1 second indicators and controlled by the second switch, wherein an input terminal of the (1-1)-th mode determination switching element is connected to the first switching element, and an input terminal of the (2-1)-th mode determination switching element is connected to the second switching element.

* * * * *